Nov. 24, 1931.  P. JAGER  1,833,836
GRAIN CUTTER AND BINDER
Filed March 19, 1931  7 Sheets-Sheet 5
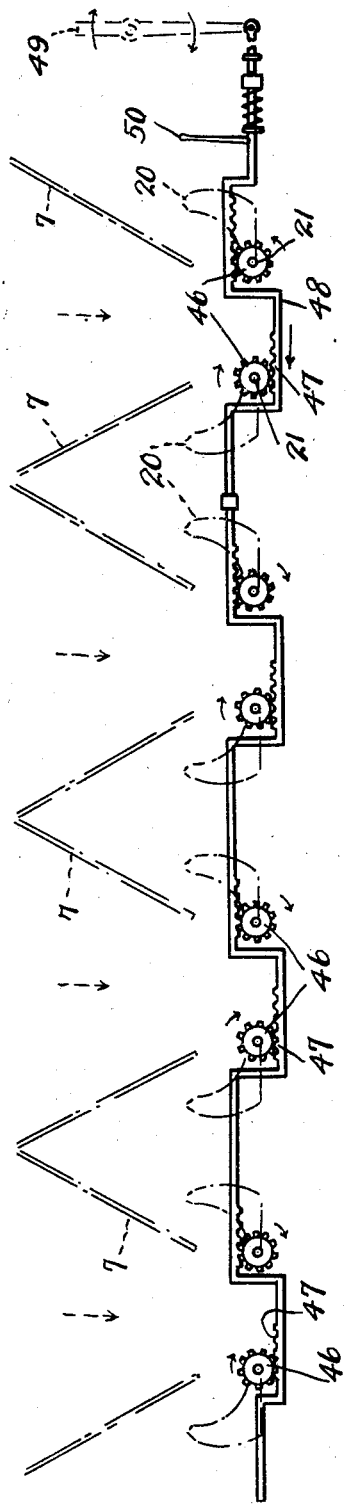
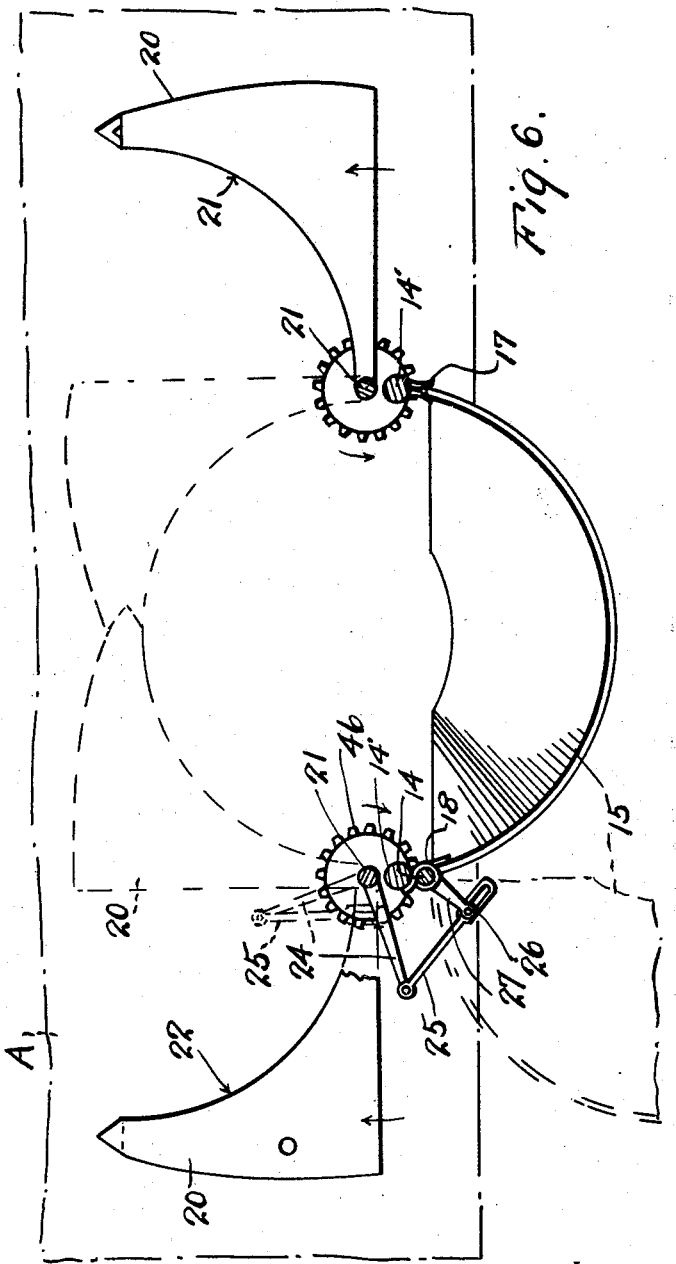
Inventor
*Peter Jager*
By *Clarence A. O'Brien*
Attorney

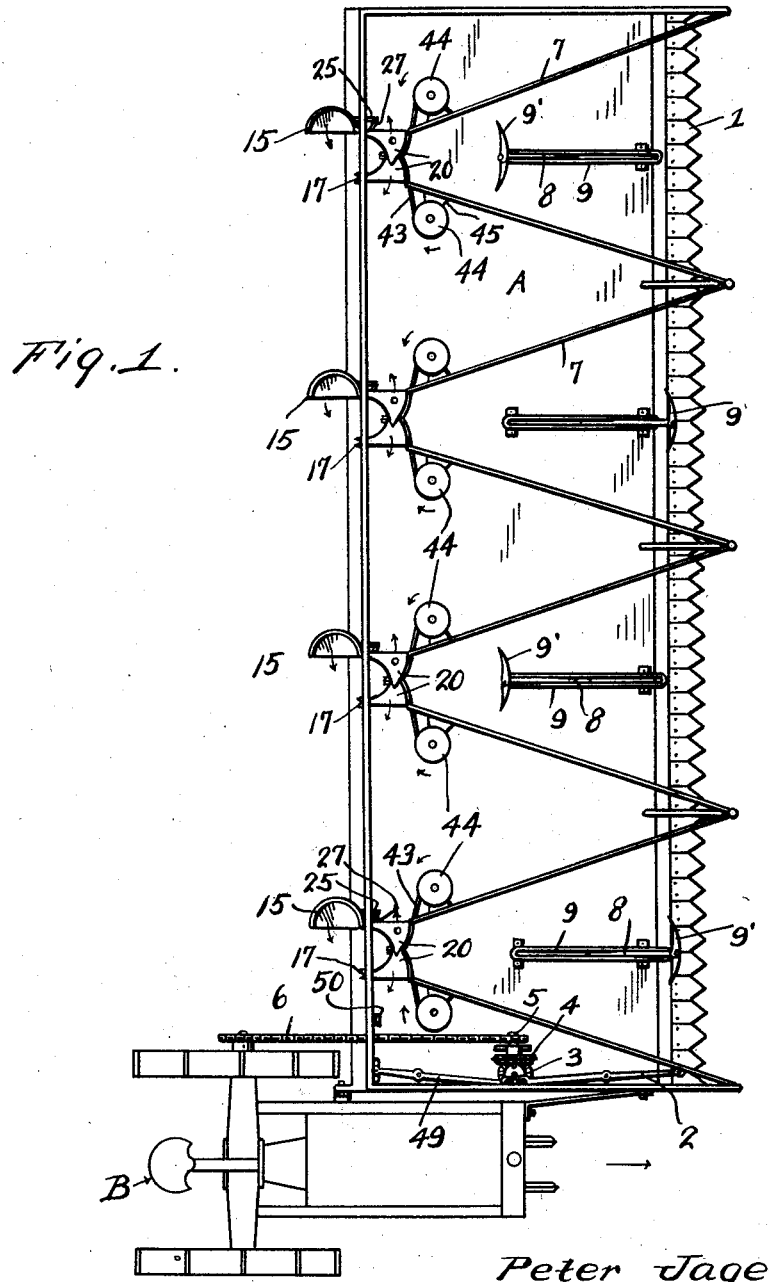

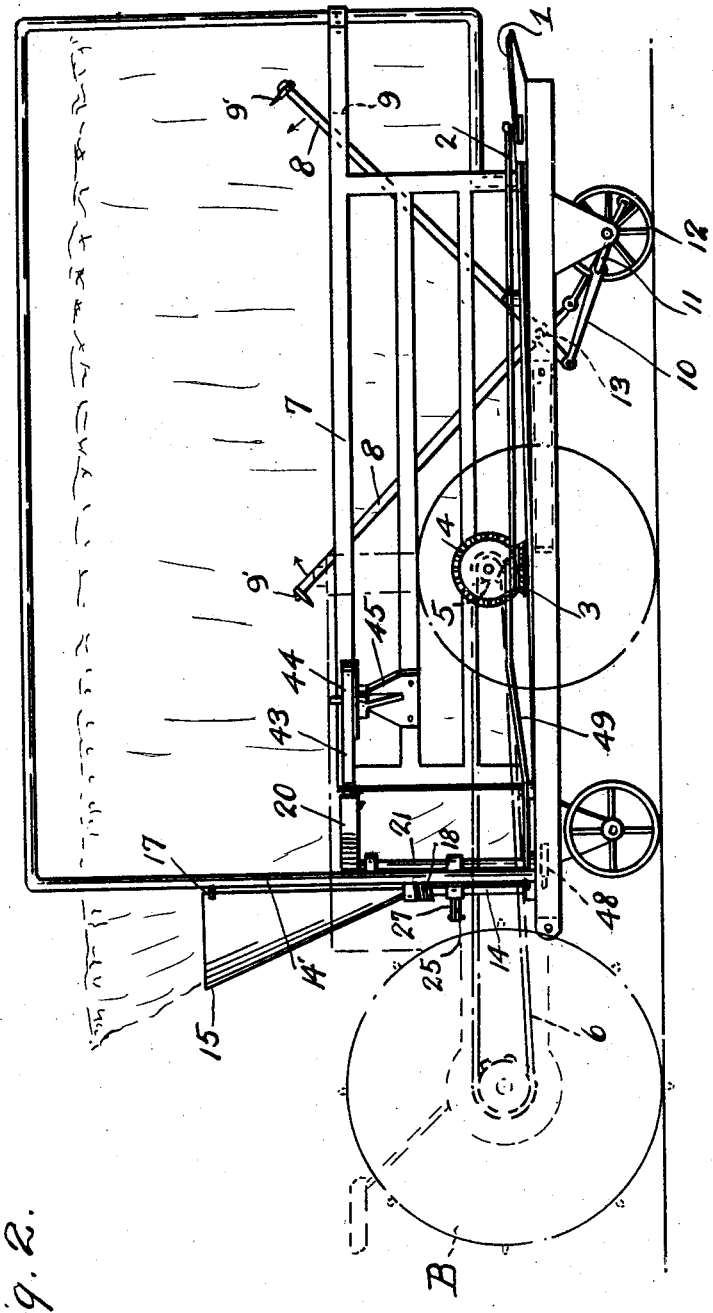

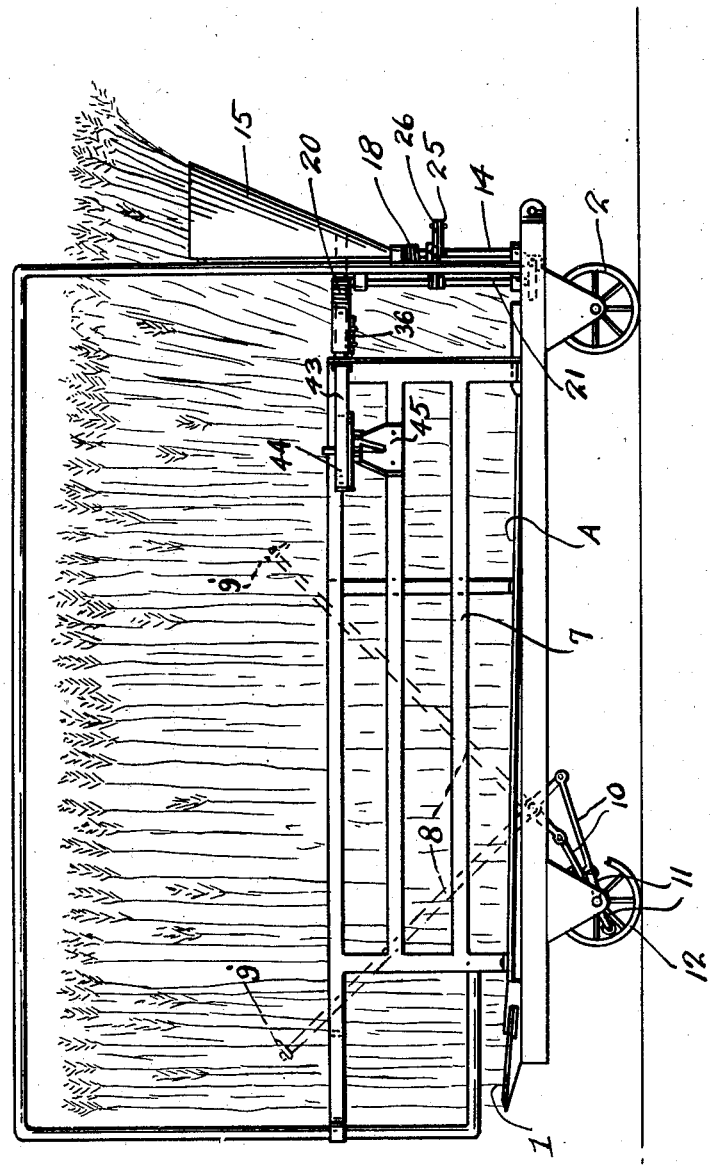

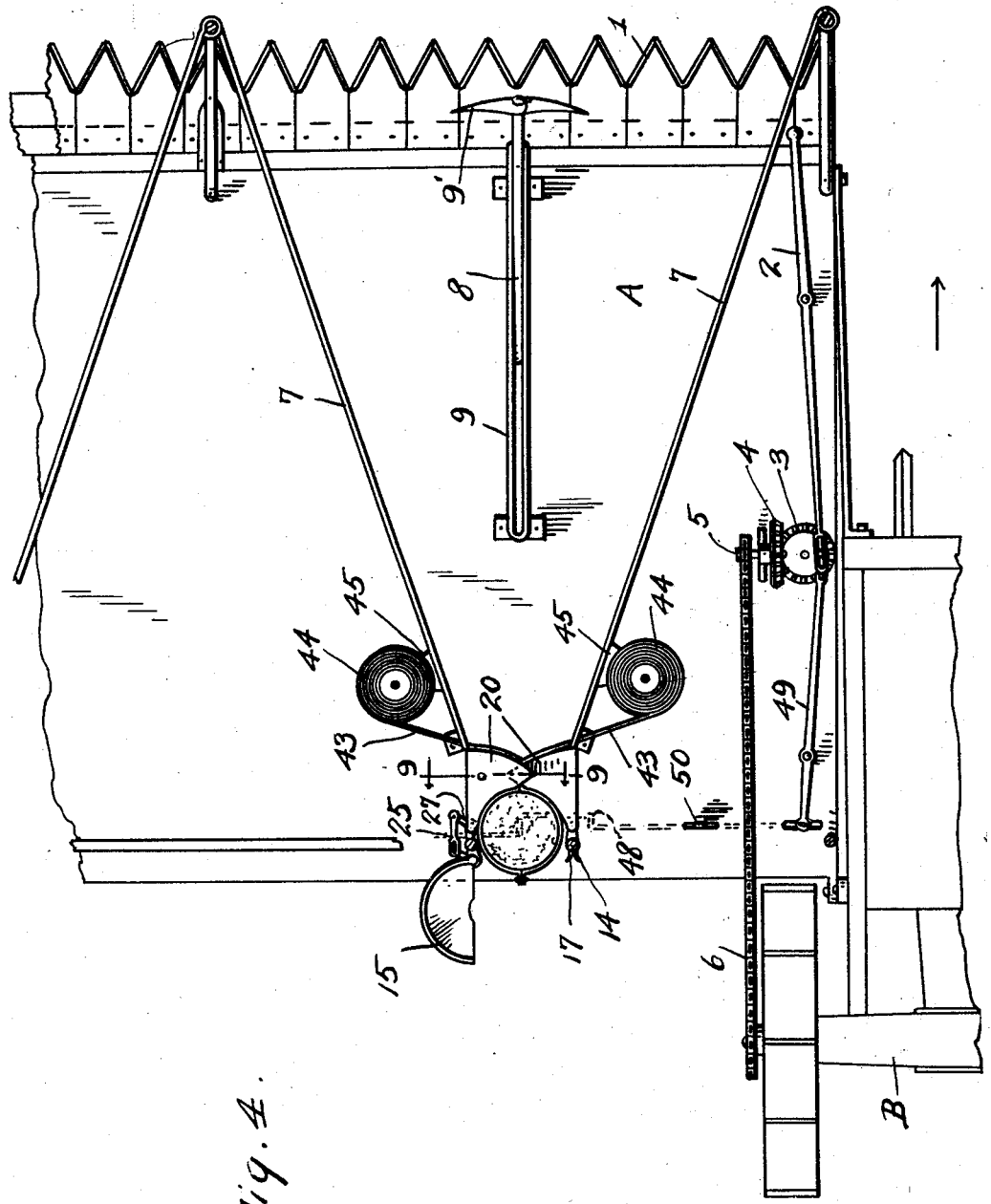

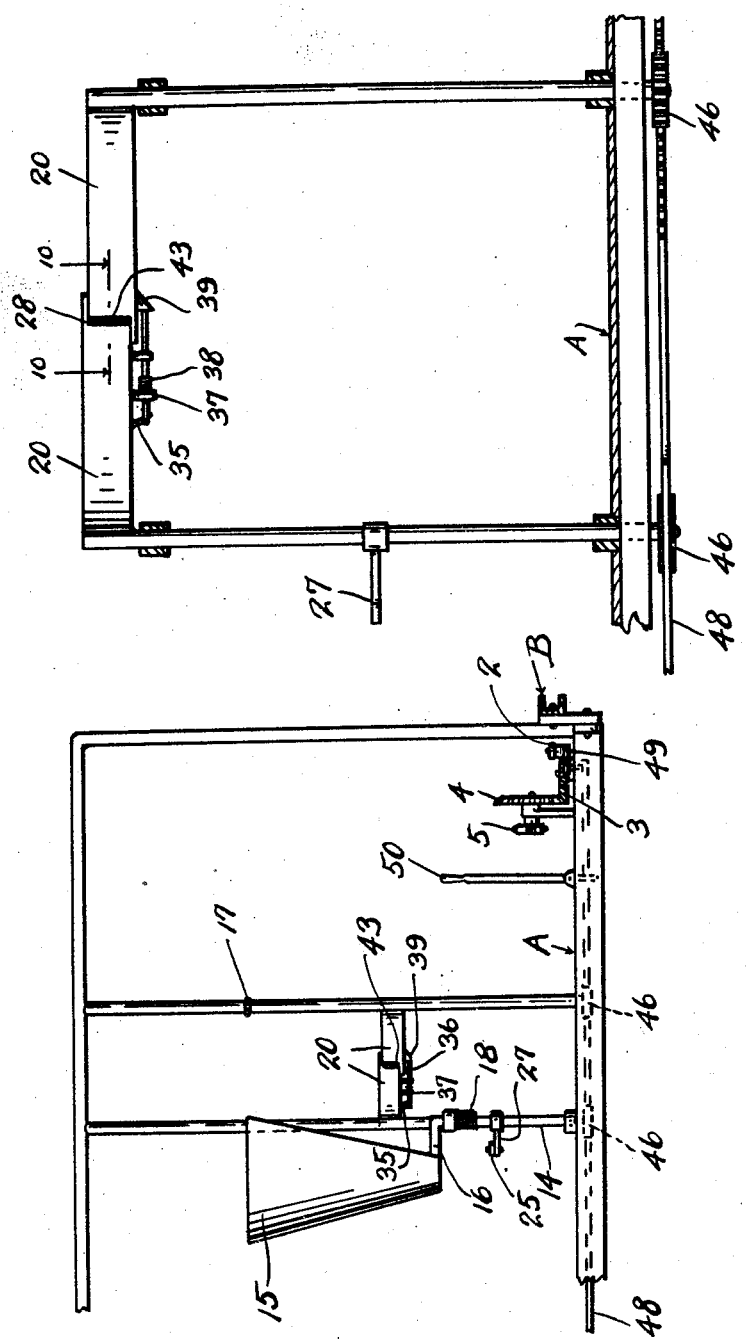

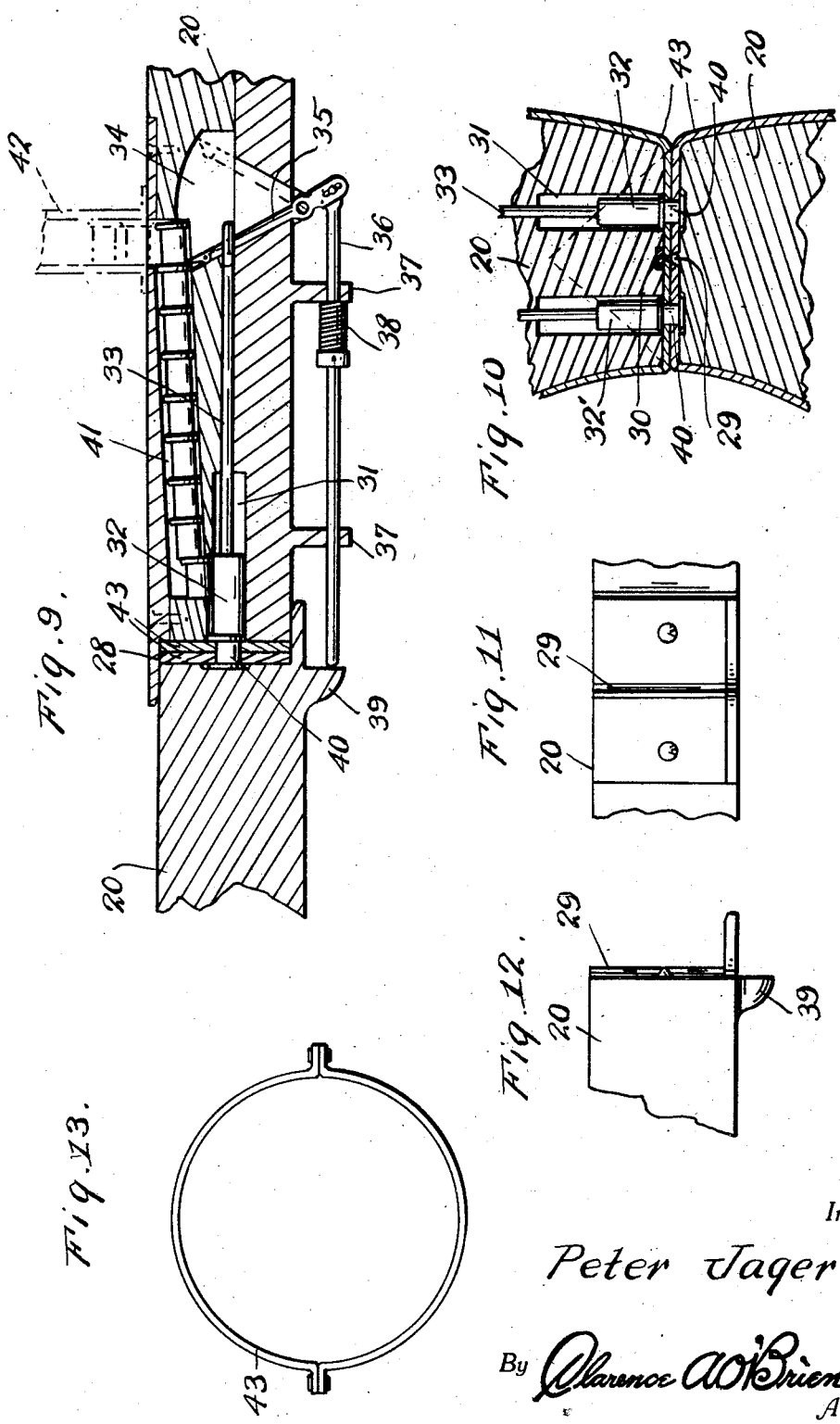

Patented Nov. 24, 1931

1,833,836

UNITED STATES PATENT OFFICE

PETER JAGER, OF BEDFORD, INDIANA

GRAIN CUTTER AND BINDER

Application filed March 19, 1931. Serial No. 523,862.

This invention relates to an apparatus for cutting grain and binding the same into sheaves or bundles, the general object of the invention being to provide a frame having a knife carrying bar thereon for cutting the grain, with means for guiding the cut grain to the rear part of the platform, where it is formed into bundles or sheaves, with means for fastening a tape around the sheaves, and then discharging the same from the rear of the platform.

Another object of the invention is to provide means whereby the apparatus can be operated from a tractor, or from a ground wheel of a propulsion apparatus, and also to provide means whereby certain parts can be operated by hand when necessary.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the apparatus showing the same attached to a tractor.

Fig. 2 is a side view of the apparatus.

Fig. 3 is a view of the opposite side thereof.

Fig. 4 is an enlarged plan view of a portion of the apparatus with a part of the tractor.

Fig. 5 is a diagrammatic plan view showing the operating means for the devices which form the grain into bundles.

Fig. 6 is an enlarged detail view of bundle forming means.

Fig. 7 is a side view of a part of the supporting frame, and one of the bundle forming means.

Fig. 8 is a sectional view with parts in elevation showing the operating means for the bundle forming means.

Fig. 9 is a section on the line 9—9 of Fig. 4.

Fig. 10 is a section on the line 10—10 of Fig. 8.

Fig. 11 is a detail view of one end of one of the swinging members for riveting and cutting the tapes.

Fig. 12 is a side view of Fig. 11.

Fig. 13 is a view of the tape after the same has been formed into a band.

In these drawings, the letter A indicates a platform which is supported by the wheels 2 and which may be propelled by a tractor B or any other propelling means, the drawings showing the tractor at one side of the apparatus.

The usual cutting bar 1 is arranged at the front end of the platform and operated by a lever 2 pivoted intermediate its ends on the platform and operated by a crank gear 3 which is driven by a gear 4, the shaft 5 of which is connected by the sprocket mechanism shown generally at 6 from one of the wheels of the tractor or the axle thereof.

A plurality of pairs of guiding members 7 are vertically arranged on the platform, each pair converging forwardly so as to guide the cut grain to the bundle or sheaf forming means at the rear of the platform. If desired or necessary, push arms 8 may be provided for pushing the grain rearwardly thru the guiding members, each arm having a pivoted head 9 thereon. Each arm has its lower end passing through a slot 9 in the platform and said lower end is connected by a link 10 to a crank 11 on the front axle 12 of the apparatus, and each arm is pivotally connected to the platform as shown at 13.

A pair of posts 14 is mounted on the rear part of the platform rearwardly of the rear end of each pair of the guiding members 7, and a substantially semi-circular member 15 of downwardly tapered shape has an arm 16 at its lower end pivotally connected with one of the posts. A latch 17 is carried by the other post for engaging the free edge of the member 15 to hold the same in a position extending across the posts to feed the grain passing from the pair of guide members 7. This member 15 is actuated by a spring 18 which tends to hold the member 15 in open position.

A pair of substantially L-shaped members 20 are connected to the vertical shafts 21, each of which is arranged in front of a post 14 and the inner edge of each member 20 is curved out as shown at 22 so that the curved faces of the two members 20 form with the member 1 a substantially circular opening to receive the bundles of grain.

An arm 24 is connected to one of the shafts 21 of each pair, and a link 25 is pivoted to the outer end of the arm and has a slot at its other end for receiving a pin 26 in an arm 27 connected with the member 15 so that when the member 20 has almost reached a closed position, the member 15 is moved to free it from the latch 17, so that the spring 18 will swing the said member 15 to open position as shown in dotted lines in Fig. 6.

The free end of the members 20 is provided with the projections 28, one projection overlapping the opposite member 20, when the two members come together as shown in dotted lines in Fig. 6, and in full lines in Fig. 9 and the free end of one of the members 20 is formed with a knife 29 and the free end of the other member is formed with a recess to receive a plate 30 which alines with the knife when the two members come together.

The free end of one of the members is formed with a recess 31 in which is arranged a plunger 32, the stem 33 of which passes through a small bore in the member and passes out into a chamber 34 in which operates a lever 35 pivoted to a part of the member and having its outer end slotted to receive a pin on a rod 36 slidably supported in the perforated lugs 37 on said member, the rod being normally held in a position with member 35 holding the stem and plunger in a retracted position by a spring 38. When the two members 20 come together, however, the end of the rod 36 will strike a projection 39 on the other member 20 so that the rod will be caused to swing the lever 35 in a direction to project the plunger to engagement with the rivet 40 which has dropped into the front end of the recess 31 from an inclined passage 41 to which the rivets are fed from a hopper 42. Thus the plunger will force its rivet through a pair of ribbons 43 positioned between the abutting ends of the two members 20 and then upset the rivet.

A similar arrangement of plunger means is shown at 32' and it will be seen that these plungers are located one on each side of the knife 29 so that a pair of rivets will be forced through the two ribbons and upset and the knife will sever the ribbon between the two rivets, so that both double portions of the ribbons will be fastened together.

The two ribbons are fed from the rolls 44, supported by the brackets 45 on the guiding member 7. Each shaft 21 has a gear 46 attached to its lower part, and these gears are engaged by the racks 47 on the bar 48 which is composed of a number of substantially U-shaped portions alternately arranged, so that the shafts of each pair will be rotated in opposite directions as shown by the arrows in Fig. 5. The rack bar 48 is reciprocated by the lever 49 pivoted to the platform with the slotted end engaging the crank pin of the gear 3 as shown in Fig. 4.

I also provide a hand lever 50 for reciprocating the bar 48 by hand when desired.

From the foregoing, it will be seen that the grain cut by the knives 1 will be guided across the platform by the members 7 and from these guiding members the grain will pass into the space formed by the member 15 which is in closed position as shown in Fig. 6. The grain will accumulate in front of this member 15 in a bundle and then the members 20 swing inwardly until the free ends overlap as shown in Fig. 9, it being understood that the ribbons are first passed into the space between the members 20 and into the member 15 where the ends are connected together, so that the bundle of grain rests against portions of these ribbons.

The members 20 then move toward each other to form the grain into bundles, and at the same time cause the ribbons to encircle the bundle, and as the free ends of the members come together, the plungers 32 are actuated to force a pair of rivets through the ribbons and upset the rivets and then the knife cuts through the ribbons thus severing the portions of the ribbons passing around the bundle from the other portions, but leaving the ends of the unsevered portions of the ribbons fastened together.

As the members 20 come together, the member 15 is opened, so that the bundles can drop from the platform, and then the members 20 are opened on the reverse movement of the rack bar 48 so that the member 15 is again closed, and as the grain presses against the ribbons, it will push their connected ends into the member 15, so that another bundle is formed and then the members 20 swing together again to form another bundle and to fasten other portions of the ribbons around the bundle as before described.

It is thought from the foregoing description that the advantages and novel features of the invention will be readily apparent.

It is to be understood that changes may be made in the construction and in the combination and arrangement of the several parts, provided that such changes fall within the scope of the appended claims.

Having thus described my invention, what I claim as new is:—

1. An apparatus for cutting grain and binding the same into bundles, comprising a platform, cutting means at the front edge thereof, convergingly arranged guiding means on the platform for guiding the cut grain to the rear thereof in a compact mass, a substantially semi-circular member against which the mass is pressed, a pair of pivoted members having curved edges forming with the semi-circular member, a bundle receiving space of substantially circular form, means for moving the semi-circular member to an open position when the pivoted members are moved into closed position, means for supporting a pair of ribbon rolls adjacent the rear of the platform whereby the ribbons can be connected together, and have portions placed in the semi-circular member so that the pivoted members will press the ribbons around the grain, means carried by the pivoted members for fastening the ribbons together and means for severing the ribbons by said pivoted members, and means for actuating the pivoted members.

2. An apparatus of the class described comprising a platform, cutting means at the front end thereof, convergingly arranged guiding means for guiding the grain cut by the cutting means to the rear of the platform, a substantially semi-circular member arranged to receive the grain from each pair of guiding means, a support to which one edge of the semi-circular member is pivoted, latch means for the other end of the semi-circular member, a pair of substantially L-shaped members associated with each semi-circular member, means for supporting a pair of ribbon rolls adjacent the semi-circular member with the ends of the ribbons connected together, and placed in the semi-circular member, means at the free ends of the L-shaped members for pressing the two ribbons together and fastening them together in two places, means at the free end of one of the L-shaped members for severing the ribbons between the fastening means, means for actuating the members, and means for swinging the semi-circular member to open position when the L-shaped members come together.

3. An apparatus of the class described comprising a platform, cutting means at the front edge thereof, a plurality of pairs of convergingly arranged guiding members for guiding the cut grain to the rear part of the platform, a plurality of pairs of uprights at the rear of the platform, a semi-circular member hingedly connected at one edge to one of the uprights, of each pair, a latch carried by the other upright of each pair for engaging the free edge of the semi-circular member, a plurality of pairs of shafts on the platform, each pair being arranged adjacent a pair of the uprights, a substantially L-shaped member connected to each shaft, the inner edges of the said members being curved to form with the semi-circular member, a space of substantially semi-circular shape to receive the grain from the guiding members, a pair of plungers carried by the free end of one L-shaped member of each pair, means for feeding rivets to each plunger, means actuated by the L-shaped members coming together to operate the plungers, means for supporting a pair of ribbon rolls in front of each pair of L-shaped members with the ends of these ribbons connected together and placed in the semi-circular member, whereby when the L-shaped members approach each other, they will cause the ribbons to pass around the grain collecting in front of the semi-circular member and the plungers will force the rivets into the ribbons to connect them together in two places, a knife carried by one of the L-shaped members for severing the ribbons between the rivets, means for causing the semi-circular member to open position as the L-shaped members come together and means for operating the shafts to which the L-shaped members are connected to cause said shafts to open and close said L-shaped members.

4. An apparatus of the class described comprising a platform, cutting means at the front edge thereof, a plurality of pairs of convergingly arranged guiding members for guiding the cut grain to the rear of the platform, a plurality of pairs of uprights at the rear of the platform, a semi-circular member hingedly connected at one edge to one of the uprights, of each pair, a latch carried by the other upright of each pair for engaging the free edge of the semi-circular member, a plurality of pairs of shafts on the platform, each pair being arranged adjacent a pair of uprights, a substantially L-shaped member connected to each shaft, the inner edges of the said members being curved to conform with the semi-circular member, a space of substantially semi-circular shape to receive the grain from the guiding means, a pair of plungers carried by the free end of one L-shaped member of each pair, means for feeding rivets to each plunger, means actuated by the L-shaped members coming together to operate a plunger, means for supporting a pair of ribbon rolls in front of each pair of L-shaped members, with the ends of these ribbons connected together and placed in a semi-circular member, whereby when the L-shaped members approach each other, they will cause the ribbons to pass around the grain collecting in front of the semi-circular member and the plungers will force the rivets into the ribbons to connect them together in two places, a knife carried by one of the L-shaped members for severing the ribbons between the rivets, means for moving the semi-circular member to open position as the L-shaped members come together and means for operating the shafts to which the L-shaped members are connected to cause said shafts to open and close said L-shaped members, and means for pushing the grain through the guiding means.

In testimony whereof I affix my signature.

PETER JAGER.